(12) United States Patent
Morea et al.

(10) Patent No.: US 10,280,331 B2
(45) Date of Patent: May 7, 2019

(54) CURABLE LIQUID COMPOSITIONS

(71) Applicant: PQ SILICAS UK LIMITED, Cheshire (GB)

(72) Inventors: Gemma Morea, Cheshire (GB); Alan Reginald Minihan, Merseyside (GB)

(73) Assignee: PQ Silicas UK Limited, Cheshire (GB)

( * ) Notice: Subject to any disclaimer, the term of this patent is extended or adjusted under 35 U.S.C. 154(b) by 0 days.

(21) Appl. No.: 14/443,506

(22) PCT Filed: Dec. 19, 2013

(86) PCT No.: PCT/GB2013/053360
§ 371 (c)(1),
(2) Date: May 18, 2015

(87) PCT Pub. No.: WO2014/096831
PCT Pub. Date: Jun. 26, 2014

(65) Prior Publication Data
US 2015/0307735 A1 Oct. 29, 2015

(30) Foreign Application Priority Data

Dec. 19, 2012 (GB) .................................. 1222908.4

(51) Int. Cl.
| | | |
|---|---|---|
| C09D 11/10 | (2014.01) | |
| C08K 5/3467 | (2006.01) | |
| C09D 167/00 | (2006.01) | |
| C09D 5/00 | (2006.01) | |
| C08K 3/36 | (2006.01) | |
| C08K 3/34 | (2006.01) | |
| C09D 7/42 | (2018.01) | |
| C09D 7/61 | (2018.01) | |

(52) U.S. Cl.
CPC .............. *C09D 167/00* (2013.01); *C08K 3/34* (2013.01); *C08K 3/36* (2013.01); *C09D 5/00* (2013.01); *C09D 7/42* (2018.01); *C09D 7/61* (2018.01)

(58) Field of Classification Search
CPC .......... C09D 167/00; C08K 3/34; C08K 3/36
USPC ......... 29/890.1; 428/32.34; 524/91, 98, 444, 524/456, 493
See application file for complete search history.

(56) References Cited

U.S. PATENT DOCUMENTS

| | | | | |
|---|---|---|---|---|
| 3,787,221 A | * | 1/1974 | Topcik ....................... | B01J 2/28 106/491 |
| 3,993,497 A | * | 11/1976 | Wason ...................... | A61K 8/25 106/483 |
| 5,637,636 A | * | 6/1997 | Cartwright ............ | C01B 33/193 423/335 |
| 2002/0055556 A1 | | 5/2002 | Schubert et al. | |
| 2005/0065268 A1 | * | 3/2005 | Morea-Swift ......... | C09C 1/3072 524/492 |
| 2006/0168811 A1 | * | 8/2006 | Ozawa ................. | B41M 5/5218 29/890.1 |
| 2007/0179268 A1 | | 8/2007 | Lejeune et al. | |
| 2009/0004396 A1 | | 1/2009 | Wu et al. | |
| 2009/0253833 A1 | * | 10/2009 | Hage .................... | C08K 5/3467 524/91 |

FOREIGN PATENT DOCUMENTS

| | | |
|---|---|---|
| CN | 1723133 | 1/2006 |
| CN | 101410438 | 4/2009 |
| CN | 101454544 | 6/2009 |
| CN | 101688026 | 3/2010 |
| EP | 2607434 | 6/2013 |
| GB | 918802 | 2/1963 |
| GB | 1434191 | 5/1976 |
| JP | 2004269807 A | 9/2004 |
| JP | 2009542829 A | 12/2009 |
| JP | 2010084081 | 4/2010 |
| JP | 2010229302 A | 10/2010 |
| JP | 2014506284 A | 3/2014 |
| WO | 9634079 | 10/1996 |
| WO | 2004090054 A1 | 10/2004 |
| WO | 2008003652 A1 | 1/2008 |
| WO | 2011083309 | 7/2011 |
| WO | 2012079624 | 6/2012 |

OTHER PUBLICATIONS

International Preliminary Report on Patentability and Written Opinion for PCT/GB2013/053360, dated Jul. 2, 2015.
UKIPO Search Report for Application No. GB1222908.4 dated May 10, 2013.
De Boer, J.W. et al., The Quest for Cobalt-Free Alkyd Paint Driers, Eur. J. Inorg. Chem, 2013, 3581-3591, Wiley-VCH Verlag GmbH & Co. KGaA, Weinheim.
Paint, Chapter 12 Light, Section 12.4, 2001, 1-13, John Wiley & Sons.
Chinese Office Action for Application No. 2013800658842 dated Aug. 24, 2016.
Office Action for Japanese Patent Application Serial No. 2015-548758 dated Oct. 17, 2017.

* cited by examiner

*Primary Examiner* — Bijan Ahvazi
(74) *Attorney, Agent, or Firm* — Buchanan Ingersoll & Rooney PC

(57) ABSTRACT

A curable liquid composition, such as an alkyd paint or resin, contains a binder curable by oxidative crosslinking, a siccative compound for catalyzing oxidative crosslinking of the binder, and a matting agent. The matting agent is a precipitated silica, with a surface area, measured by BET, of 250 $m^2/g$ or less, a precipitated metal silicate such as Ca, Mg or Al silicate, or a mixture, and may be amorphous in nature. The siccative compound is a transition metal chelate complex comprising a ligand, such as an iron- or a manganese-based chelate complex.
The compositions are capable of oxidative curing, within acceptable times, to form a cured solid, such as a coating, having a matt finish.

25 Claims, No Drawings

CURABLE LIQUID COMPOSITIONS

FIELD

The invention relates to curable liquid compositions, such as alkyd paints, which contain a binder that is curable by oxidative cross-linking, for instance by reaction with oxygen from ambient air. In particular, the invention relates to curable liquid compositions, containing transition metal chelate complexes as siccative compounds, in combination with a matting agent used to provide a matt finish to surfaces of the cured compositions.

BACKGROUND

Oil paint, one of the oldest forms of paint, is based upon a curable binder derived from vegetable oils, referred to as hardening oils, such as linseed. Such oils are esters formed by reaction of fatty acid with glycerol: the hydrocarbon tail of the fatty acid includes conjugated dienes which can undergo mutual cross-linking in the presence of oxygen, or other oxygen generators, such as peroxides.

Modern, synthetic versions of such oil paints are referred to as alkyd paints. The term alkyd originates from the AL of polyhydric ALcohols and the CID (modified to KYD) of the aCIDs used to react together to form a polyester. Hence, the terms alkyd and polyester are synonymous. In conventional usage, the term alkyd is usually used to refer to polyesters modified to include fatty acid chains from hardening oils as side groups to the polymer chain.

A typical alkyd resin may be prepared by heating a hardening oil (also referred to as drying oils or semi-drying oils in the prior art and in this specification) such as linseed oil with an acid anhydride and glycerol to obtain a polyester with unsaturated side groups (say $C_{12}$ to $C_{24}$ hydrocarbon chains) derived from the fatty acid groups of the oil.

For use in paints, varnish, ink or coating material, the alkyd resin may be either emulsified in water or in aqueous solution, or may be dissolved in an organic solvent. For the sake of brevity, the term "alkyd paints" is used in this specification to mean water-based or solvent-based paints, varnish, ink, coating material or the like, which are based upon an alkyd binder curable by oxidative cross-linking. Typically, ambient oxygen from the air will provide the oxidative cross-linking, but other oxide sources such as peroxides may be employed additionally or alternatively, as set out herein.

The drying of alkyd paints is understood to take place through two identifiable, distinct mechanisms. Firstly, evaporation of solvent from the composition leads to a high viscosity, tacky layer being formed. Secondly, oxidative cross-linking takes place between the unsaturated fatty acid moieties of the alkyd resin within the layer resulting in the hardening of the film. These two mechanisms may be referred to as physical drying and chemical drying (the latter also referred to as oxidative drying or curing in this specification) and may occur concurrently and/or sequentially. The chemical drying stage is an auto-oxidation process which typically proceeds by a free-radical chain reaction mechanism which can be described in terms of the stages of initiation, propagation and termination. Many alkyd paints includes a siccative agent to act as an initiator of this chemical drying stage.

Cobalt compounds, particularly cobalt soaps, are generally widely used as siccative agents (catalysts for initiation of chemical drying) for the oxidative drying of alkyd paints or paints based on other curable resins. In recent years, the toxic, and potentially carcinogenic, nature of cobalt, as well as its undesirability in the environment as a waste product, has led to moves in the alkyd paint industry away from cobalt-based siccative compounds and towards alternative siccative compounds. The International patent application publication WO2008/003652 A1 discloses siccative compounds for air-drying of alkyd-based resins and coatings such as paint, varnish or wood stain inks and linoleum floor coverings, based on an iron/manganese complex containing tetradentate, pentadentate or hexadentate nitrogen donor ligands.

Binders curable by oxidative cross-linking, in addition to their use in paints, may also be employed as the basis for thermosetting resins used for a variety of industrial purposes such as casting materials, fibre reinforced materials and coatings.

When curable binders are for use in structural materials, rather than as paints, varnishes, inks or the like, curing may be achieved by means of the further incorporation of an unsaturated vinyl monomer, such as styrene, into the resin, to facilitate cross-linking (curing) of the resin in combination with a peroxide-type initiator through a free-radical copolymerisation mechanism. Once again, it is typical to use cobalt-based compounds as siccative agents (primary accelerator) for speeding the curing of such curable alkyd resins. As was set out above in relation to alkyd paints, it is desirable to replace cobalt-based siccative compounds with safer and more environmentally acceptable alternatives. International patent application publication WO2011/083309 A1 discloses accelerators for assisting in the curing of unsaturated polyester resins, vinyl ester resins and acrylic resins in conjunction with peroxide type initiators. The disclosed accelerators are based on iron/manganese complexes of a tridentate, tetradentate, pentadentate or hexadentate nitrogen donor ligand.

Throughout this specification, the terms "drying" and "curing" are used interchangeably to refer to the transformation of a curable liquid composition from a liquid state into a solid state with a hard, solid surface.

SUMMARY OF THE INVENTION

Synthetic silica is sometimes used as a matting agent for alkyd paints. It has now been found that when cobalt-based siccative agents, such as cobalt soaps, are replaced by siccative agents based upon transition metal chelate complexes comprising a ligand, there appears to be an interaction between the replacement siccative agents and the synthetic silicas conventionally used as matting agent, which may lead to hindering of the effectiveness of the siccative agents, resulting in longer drying times than would be achieved in the absence of the synthetic silica. In other words, although cobalt-replacement siccative agents based upon transition metal chelate complexes comprising a ligand have been useful for gloss coatings, the long drying times that result for matt coatings are problematic. Typically, synthetic silicas conventionally used as matting agents have high surface area and high pore volume.

Hence, there is a need for matting agents, suitable for use in alkyd paints, thermosetting resins, or other liquid compositions cured by oxidative crosslinking, using manganese- or iron-based siccative agents, wherein the matting agent does not give rise to an unacceptable loss in performance of the siccative agent, and so that incorporation of the matting agent does not give rise to an unacceptable or excessive increase in curing time for the alkyd paint, yet still provides an acceptable matting effect to remove the gloss finish for the cured composition.

A first aspect of the invention provides a curable liquid composition comprising:
a) a binder curable by oxidative crosslinking,
b) a siccative compound adapted to catalyse oxidative crosslinking of the binder, and
c) a matting agent,
characterised in that the siccative compound is a transition metal chelate complex comprising a ligand, and the matting agent is:
a precipitated silica having a surface area of 250 m$^2$/g or less, preferably 200 m$^2$/g or less, as measured by BET,
a precipitated metal silicate, or
a mixture thereof.

A second aspect of the invention provides the use of:
a precipitated silica having a surface area of 250 m$^2$/g or less, preferably 200 m$^2$/g or less, as measured by BET,
a precipitated metal silicate, or
a mixture thereof,
as a matting agent for a curable liquid composition, the curable liquid composition comprising:
a binder curable by oxidative crosslinking, and
a transition metal chelate complex comprising a ligand as a siccative compound adapted to catalyse oxidative crosslinking of the binder.

DETAILED DESCRIPTION OF THE INVENTION

Throughout this specification, the term "comprising" or "comprises" means including the component(s) specified but not to the exclusion of the presence of others. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, a composition consisting essentially of a set of components may comprise less than 10% by weight, typically less than 5% by weight, more typically less than 1% by weight of non-specified components.

Whenever appropriate, the use of the term "comprises" or "comprising" may also be taken to include the meaning "consists essentially of" or "consisting essentially of" and also may be taken to include the meaning "consists of" or "consisting of".

References to aqueous or water-based solvents or liquids mean that the solvent or liquid comprises from 65 to 100% by weight of water.

The optional and/or preferred features set out below may be used either individually or in combination with each other, where appropriate, and particularly in the combinations as set out in the accompanying claims. The optional and/or preferred features for each aspect of the invention set out hereinafter are to be read as also applicable to any other aspects of the invention, unless evidently inappropriate.

The first aspect of the invention provides a curable liquid composition comprising a binder curable by oxidative cross-linking. The binder preferably comprises a conjugated poly-unsaturated fatty acid moiety.

The binder may simply be an unsaturated oil or acid, or may preferably be a cross-linkable resin, comprising unsaturated groups, such as unsaturated polyester, vinyl ester or acrylic resin. Preferably the binder is, or comprises, an alkyd resin.

The compositions of the invention will typically comprise from about 1 to about 90% by weight of binder, preferably from about 20 to about 70% by weight of binder.

Alkyd resins may be obtained by a polycondensation reaction of one or more polyhydric alcohols, one or more polycarboxylic acids or the corresponding anhydrides, and long chain unsaturated fatty acids or oils.

Glycerol is a widely available polyol suitable for use in the preparation of alkyd resins. Other examples of suitable polyhydric alcohols include: pentaerythritol, dipentaerythritol, ethylene glycol, diethylene glycol, propylene glycol, neopentyl glycol, trimethylol propane, trimethylol ethane, di-trimethylol propane, 1,6-hexane diol and the like. Polycarboxylic acids, or their corresponding anhydrides, suitable for use in preparing alkyd resins, include: phthalic acid and its isomers, trimellitic acid, pyromellitic acid, pimelic acid, adipic acid, azelaic acid, sebacic acid, maleic acid, fumaric acid and tetra-hydrophthalic acid. Suitable drying fatty acids, semi-drying fatty acids or mixtures thereof, useful for the preparation of alkyd resins include ethylenically unsaturated, conjugated or non-conjugated $C_{12}$-$C_{24}$ carboxylic acids, such as oleic, ricinoleic, linoleic, linolenic, licanic and eleostearic acids or mixtures thereof. Typically, the acids may be used in the form of mixtures of fatty acids derived from natural or synthetic oils. The terms "semi-drying" and "drying fatty acids" are used above to describe fatty acids that have been derived from semi-drying or drying oils (i.e. hardening oils such as linseed oils). The classification of such oils is based on the iodine value for the oil; for a drying oil the iodine value is suitably greater than 140. For a so-called semi-drying oil, the iodine value is from 125 to 140, and for a non-drying oil the iodine value is less than 125. The fatty acids may be derived by hydrolysis of an oil and subsequent removal of glycerol.

The alkyd resins are typically oxidatively cross-linked by means of reaction with oxygen from ambient air when used in alkyd paints. Such paints (including varnishes etc. as set out herein) are generally applied as thin layers through which atmospheric oxygen may rapidly diffuse in order to provide oxidative curing.

When thicker structures formed from curable liquid compositions of the invention are desired, the curable liquid composition may be cured by use of a peroxide type initiator. The curable liquid composition may also comprise an unsaturated vinyl monomer such as styrene to facilitate curing of the curable liquid composition. When a peroxide compound is used for oxidative cross-linking, rather than oxygen from ambient air the peroxide initiator may be any peroxide known to the skilled person as suitable for use in curing of unsaturated polyester, vinyl ester or acrylic resins. Such peroxides include organic and inorganic peroxides, either solids or liquids, and also hydrogen peroxide may be employed. Examples of suitable peroxides include peroxycarbonates, peroxyesters, dialkylperoxides and the like. Suitable peroxides may be oligomeric or polymeric in structure. Liquid peroxyester, liquid hydroperoxide or a liquid mixture of hydroperoxides may be particularly useful for blending into the curable liquid composition of the invention.

The curable liquid composition of the first aspect of the invention also comprises a siccative compound adapted to catalyse oxidative crosslinking of the binder. The siccative compound is a transition metal chelate complex comprising a ligand. By the term "transition metal" as used herein is meant elements within the d-block portion of the periodic table containing the element groups 3 to 12, and so including zinc, cadmium and mercury as well as the lanthanides and actinides. Preferably the siccative compound is a chelate complex of manganese, iron, or a mixture thereof. Such compounds are highly effective for catalysis of oxidative curing and are of relatively low toxicity. Although cobalt-based siccative compounds based on cobalt soaps are widely used in the prior art, such compounds have become undesirable because of their health and environmental hazards. Cobalt compounds may also introduce undesired colouration into the cured product derived from the curable liquid composition. Hence, the liquid compositions of the first aspect of the invention are preferably free from cobalt compounds, including cobalt-based siccative compounds. The siccative compound used in the invention is a transition metal compound and the transition metal may comprise cobalt as impurity. Any such cobalt is preferably less than 5% by weight, more preferably less than 1% by weight, even more preferably less than 0.1% by weight of the total metal content of the siccative compound.

Typically, the siccative compounds of use in the invention are effective for catalysis of curing over a wide compositional range. Hence, the siccative compounds may be present in the compositions of the invention at a level from 0.0005 to 0.1% by weight of the curable liquid composition, such as from 0.001 to 0.05% by weight, for instance from 0.002 to 0.01% by weight. Typically, the weight (parts per million of weight of composition) of chelated transition metal provided by the siccative compound in the compositions of the invention will be from 0.45 to 90 ppm, such as from 0.9 to 45 ppm, for instance from 1.8 to 9 ppm.

The curable liquid composition of the first aspect of the invention also comprises a matting agent. The matting agent is a precipitated silica, a precipitated metal silicate or a mixture thereof. A mixture of silica(s) and silicate(s) may be used as matting agent. Preferably, the precipitated silica and/or precipitated metal silicate are amorphous in nature. The use of amorphous materials provides material of the required low surface area in combination with a sufficiently high pore volume so that a good matting effect is obtainable.

When the matting agent in the composition of the first aspect of the invention is or includes a precipitated silica, the precipitated silica has a surface area of 250 $m^2/g$ or less, preferably 200 $m^2/g$ or less, more preferably 150 $m^2/g$ or less, even more preferably 100 $m^2/g$ or less and most preferably 70 $m^2/g$ or less as measured by BET. The presence of precipitated silica having larger surface areas, in the curable liquid composition, may have a detrimental effect upon the curing rate of the composition. Preferably, the precipitated silica used as matting agent in the invention has a surface area of 10 $m^2/g$ or more, such as 20 $m^2/g$ or more, as measured by BET. At lower surface areas, the matting agent, in the form of precipitated silica, may exhibit reduced effectiveness as a matting agent and so be ineffective in reducing gloss for the surface of the dried/cured composition.

Surface area and pore volume of the precipitated silica, or the precipitated metal silicate, may be measured using standard nitrogen adsorption methods of Brunauer, Emmett and Teller (BET) using a multi-point method with an ASAP 2420 apparatus supplied by Micromeritics of USA. The method is consistent with the paper by S. Brunauer, P. H. Emmett and E. Teller, J. Am. Chem. Soc., 60, 309 (1938). Samples are outgassed under vacuum at 270° C. for 1 hour before measurement. The sample tube (containing the outgassed sample) is transferred to the analysis station, submerged in liquid nitrogen and a nitrogen isotherm determined. A surface area is calculated using BET theory taking data points in the P/Po range 0.08 to 0.20. A pore volume measurement is recorded at P/Po of 0.98 on the adsorption leg.

A typical process for preparing an amorphous precipitated silica of low surface area, such as less than 250 $m^2/g$, is set out in International patent publication WO-A-97/02211. The process comprises adding a 17.0 to 21.5% by weight solution of 2.1:1 to 2.5:1 molar ratio silicate solution ($SiO_2$:$Na_2O$) to water in a mixing vessel arranged for agitation of the contents (for instance by stirring). Subsequently, further addition of a 17.0 to 21.5% by weight solution of 2.1 to 2.5 molar ratio silicate solution is carried out, together with simultaneous addition of 15 to 20% by weight sulfuric acid solution, over a period of over 40 minutes, preferably less than 80 minutes, at such flow rates that the pH is maintained in the range from 8.0 to 9.0, with the resulting solution/slurry stirred or agitated to provide mixing and to maintain precipitated solid in a suspended state in the slurry. The resultant slurry is then aged for a period of from 0 to 30 minutes, preferably from 8 to 12 minutes, at a temperature from 90° C. to 100° C. A second addition of 15 to 20% by weight sulfuric acid solution is then made to bring the pH down to pH 3 to 5. The resulting slurry is further aged for a period from 0 to 20 minutes, preferably for 8 to 12 minutes, at a temperature of between 90 and 100° C. The pH is finally adjusted to pH 3.5 to 5, and the slurry filtered, washed and dried.

This is only an example of a suitable process, and further details are found in WO-A-97/02211. Other suitable processes may be employed and the process set out above may be modified as necessary, for instance by use of different molar ratio for silicate solution, such as up to 3.5:1.

The washed and dried amorphous precipitated silica may then be comminuted and classified to provide the desired particle size range, using conventional techniques such as hammer milling, jet milling, fluid energy milling or the like, optionally with classification such as air classification.

Precipitated amorphous silicas, such as may be of use as for preparing matting agents for use in the first aspect of the invention, for instance as a basis for comminution and classification for preparing matting agents or use in the invention, are commercially available from suppliers such as PQ Corporation. A typical suitable material is Sorbosil®AC39 which is sold commercially for use as an abrasive for use in dentifrices.

When the matting agent of the invention is a precipitated metal silicate, the metal is a metal (or one or more metals) from group 2 to group 13 of the periodic table, although the precipitated metal silicate may also comprise alkali metal (i.e. group 1 metal) as a by-product of its precipitation.

When the metal is one or more metals from group 2, the metal of the metal silicate is preferably selected from calcium, magnesium or a mixture thereof. More preferably, the metal of the metal silicate from group 2 is magnesium. When the metal is from group 12, the metal silicate is preferably zinc. When the metal is from group 13, the metal silicate is preferably aluminium.

A typical process for preparing an amorphous metal silicate, suitable for use as a matting agent in the invention, is as follows:—

A quantity of aqueous solution of an alkali metal silicate, typically having an $SiO_2$:$M_2O$ molar ratio, where M is an alkali metal (usually Na or K or a mixture thereof), in the range 2.0:1 to 3.5:1, a quantity of aqueous metal salt solution (such as chloride, sulphate or nitrate), and optionally a quantity of mineral acid (such as hydrochloric, nitric or sulphuric acid—if pH reduction is required) are blended together in a reaction vessel with agitation, such as stirring, to form an aqueous reaction mixture. For instance, with calcium or magnesium as the metal, no acid is required, whereas with aluminium as the metal, acid may be added to speed precipitation. The alkali metal silicate solution, any mineral acid solution and metal salt solution are typically supplied together, in the required molar proportions, into a mixing vessel at a rate that ensures that the pH of the reaction mixture is held substantially constant at a value in the range from about 8 to 12, with sufficient agitation to maintain precipitated solids suspended in the resulting slurry. The temperature of the reaction mixture during the introduction of the silicate, the mineral acid, and the metal salt, is maintained at about 30 to 90° C. (for example, 50 to 90° C. in the case of calcium). The period over which these components are combined to form the reaction mixture is typically about 15 to 25 minutes.

Precipitated solid (metal silicate) is then separated from the liquid component of the resulting reaction mixture, for instance by filtration, and the solid is washed and dried. The reaction process may be operated as a batch process or as a continuous process, wherein reacted mixture is removed from the reaction vessel at a rate equal to the sum of the addition rates of the input solutions. The concentration of silica for the reacted mixture of this continuous or batch process is typically about 3 to 10 percent by weight of the reaction mixture.

The washed and dried amorphous precipitated metal silicate solid may then be comminuted and classified to provide the desired particle size range, using conventional techniques such as hammer milling, jet milling, fluid energy milling or the like, with classification optionally carried out, such as air classification.

Precipitated metal silicates, suitable as a basis for comminution and classification for preparing matting agents for use in the invention, are commercially available from suppliers such as PQ Corporation for use as powder flow aids or as inert liquid carriers. These are sold, for instance, under the trade names Alusil® for amorphous precipitated aluminium silicate and Microcal® for amorphous precipitated calcium silicate.

It will be evident that the precipitated metal silicate used in the invention may not necessarily be a stoichiometric metal precipitate. The precipitation may be considered, as a reaction between silicic acid and a metal salt to generate a precipitated metal silicate and acid. However, co-precipitation of the silicic acid as silica with the metal silicate (for instance intimately co-mingled within the structure of the co-precipitate) is also an option, for instance by combining acid and metal salt as reagents to react with alkali metal silicate solution to generate a co-precipitate. For the sake of clarity, it is to be understood that the term "precipitated metal silicate" means that the precipitate has a value for the molar ratio $M_xO/SiO_2$ of 0.05 or more, where M represents one or more metals from groups 2 to 13 of the periodic table and where $M_xO$ represents the stoichiometric formula of the metal oxide(s) in the precipitated silicate with x equal to 2/v where v is the valency of the metal M.

The term "precipitated silica" means that the precipitate has a value for the molar ratio $M_xO/SiO_2$ of less than 0.05, where M represents one or more metals from groups 2 to 13 of the periodic table.

When the matting agent in the composition of the first aspect of the invention is, or includes, a precipitated metal silicate, there is no particular restriction on the surface area of the precipitated metal silicate in order for it to be effective. However, the precipitated metal silicate preferably has a surface area of 450 $m^2/g$ or less, more preferably 400 $m^2/g$ or less and even more 250 $m^2/g$ or less, as measured by BET. In particularly preferred embodiments, the precipitated metal silicate has a surface area of 200 $m^2/g$ or less, preferably 100 $m^2/g$ or less and most preferably 70 $m^2/g$ or less, as measured by BET. Preferably, the precipitated metal silicate used as matting agent in the invention has a surface area of 10 $m^2/g$ or more, such as 20 $m^2/g$ or more, as measured by BET. At lower surface areas, the matting agent, in the form of precipitated metal silicate, may exhibit reduced effectiveness as a matting agent and so be ineffective in reducing gloss for the surface of the dried/cured composition.

The matting agents suitable for use in the invention may also be characterised by oil absorption value using linseed oil. Suitable matting agents will exhibit an oil absorption value from 80 to 400 g/100 g. The oil absorption value is determined by the ASTM spatula rub-out method (American Society of Test Material Standards D 281). The linseed oil used for this test is raw linseed (approximate density 0.93 gram per $cm^3$, general purpose grade) from Fisher Scientific, UK.

The test is based upon the principle of mixing linseed oil with a particulate solid by rubbing with a spatula on a smooth surface until a stiff putty-like paste is formed which will not break or separate when it is cut with the spatula. The volume of oil used is then put into the following equation:

Oil absorption value=(grams oil absorption×100)/ (weight of silica in grams)

The oil absorption value is expressed as g/100 g. In order to provide good matting performance, the oil absorption value for the matting agent may be 100 g/100 g or more.

Gloss is measured at 60 degrees on dried paints or varnishes coated on Leneta™ cards by using a BYK Multigloss meter.

In order to provide matting behaviour without causing excessive roughening of the matt surface, the particle size of the matting agent is preferably such that the $D_{50}$ median particle size diameter—50% by weight of particles less than $D_{50}$ in diameter—for the matting agent is from 3 to 15 µm as measured by light scattering. Suitably, the $D_{90}$ value for the matting agent—90% by weight of particles less than $D_{90}$ in diameter—is no more than 30 µm.

The particle diameter of the precipitated metal silicate particles is suitably determined by laser diffraction using a Malvern Mastersizer model 200, Malvern Mastersizer 2000 software v 5.60 and a Hydro-G dispersion unit. This instrument, made by Malvern Instruments, Malvern, Worcestershire, utilises Mie theory to calculate the particle size distribution. The assumed scattering component of the silica refractive index used is 1.46 and the assumed absorption component is 1.0. Water is assigned a refractive index of 1.33.

The sample is dispersed ultrasonically in water for 2.5 minutes before measurement on a 50% power setting to form an aqueous suspension with an obscuration of 15 to 25%. The pump speed is set at 50% (1250+/−20 r.p.m.) and the stirrer speed is also set at 50% (500+/−5 r.p.m.). Low power 2-5 mW He/Ne laser light (wavelength 632.6 nm) is passed through a flow cell containing the particles dispersed in de-ionised water. A blue light source (wavelength 486 nm) is also used to increase the sensitivity of the instrument to fine particles. The scattered light intensity is measured as a function of angle and this data is used to calculate an apparent particle size distribution, where the Mie model fit to the raw data has a residual of less than 1%. The volume and hence weight percentage of material above or below any specified size is easily obtained from the data generated by the instrument, assuming constant density for the particles. Throughout the present specification, weight based particle size measures are used, assuming constant density, but alternatively, these may be expressed as volume-based particle size measures, without any density assumptions.

Suitably, the amorphous precipitated metal silicate or amorphous precipitated silica, as matting agent, may be present in the curable liquid composition as from 2% to 15% percent by weight of the composition, preferably from 3% to 10% by weight in order to provide adequate matting performance without significant lengthening of curing time.

Typically, the matting agent of the invention may exhibit a pore volume of 2.0 cm$^3$/g or less, such as 1.5 cm$^3$/g or less, or even 1.3 cm$^3$/g or less. The pore volume measurement is carried out as described above. The pore volume of the matting agents used in the invention is preferably as high as possible such as 0.1 cm$^3$/g or more. Lower values of pore volume may result in reduced matting performance.

The matting agent preferably has a surface area of 70 m$^2$/g or less. Matting agents with these characteristics have been found particularly effective for use in matting varnish compositions, with high alkyd resin contents, say of 50% by weight or more, when the siccative compound used is a transition metal chelate complex comprising a ligand, particularly an iron or manganese chelate complex of this type.

Preferably, the matting agent is a precipitated metal silicate, such as an amorphous precipitated metal silicate, wherein the metal M is one or more metals from groups 2 to 13 of the periodic table and wherein the molar ratio M$_x$O/SiO$_2$ is 0.05 or more. More preferably, the metal M of the metal silicate is selected from aluminium, calcium, magnesium, zinc or a mixture thereof. Even more preferably, the metal M of the metal silicate is selected from aluminium, calcium, magnesium and mixtures thereof, most preferably aluminium or magnesium. Metal silicates, particularly the preferred metal silicates, have been found to provide matting agents of the required low surface area and with adequate pore volume, combined with the provision of good matting behaviour in combination with minimal lengthening of the curing times of the compositions, when compared to curing times for equivalent compositions with the matting agent absent. The precipitated metal silicate may suitably be such that the molar ratio M$_x$O:SiO$_2$ is from about 0.05 to 0.6, where M$_x$O represents the stoichiometric formula of the metal oxide(s) in the precipitated silicate with x equal to 2/v where v is the valency of the metal. In a particularly preferred arrangement, when the metal M is calcium or magnesium, the molar ratio M$_x$O:SiO$_2$ may be from 0.05 to 0.6, such as from 0.1 to 0.4, for instance from 0.2 to 0.3, where x=1 and v=2 for M=Ca or M=Mg. In another particularly preferred arrangement, when the metal M is aluminium, the molar ratio Al$_2$O$_3$:SiO$_2$ may be from 0.017 to 0.2, equivalent to an M$_x$O:SiO$_2$ molar ratio of from 0.05 to 0.6, such as from 0.07 to 0.5, for instance from 0.09 to 0.4, for M=Al, and x=2/3.

Because of the detrimental effect that the presence of high surface area amorphous gel or amorphous precipitated silica may have upon the curing rate of the compositions of the invention, it is preferred that the curable liquid composition of the invention comprises 0.1% by weight or less (i.e. from 0 to 0.1% by weight) of amorphous silica having a surface area greater than 250 m$^2$/g, as measured by BET. More preferably, the composition of the invention is free from amorphous silica having a surface area greater than 250 m$^2$/g, as measured by BET. When the matting agent is a precipitated metal silicate, preferably amorphous, the compositions of the invention may comprise 0.1% by weight or less of any amorphous silica or may preferably be free from any amorphous silica.

In another preferred arrangement, the matting agent may have a surface area of 70 m$^2$/g or less and the curable liquid composition may be free from, or comprise 0.1% by weight or less, of amorphous silica having a surface area greater than 70 m$^2$/g, as measured by BET. This arrangement is particularly useful when the matting agent is an amorphous precipitated metal silicate.

As is conventional in the practice of paint formulation, the silica or silicate matting agent may be wax-coated to improve the compatibility of the matting agent with the other components of the paint formulation. When wax-coated matting agents are used, the wax content is typically at least 1 wt % and may be up to about 25 wt % based on the total weight of the matting agent, preferably the wax content is up to about 20 wt %, more preferably up to about 15 wt % and most preferably up to about 10 wt % wax. Suitable waxes for coating the matting agents include polyethylene wax, microcrystalline wax (as produced from petrolatum) or the like.

The silica can be treated with a wax using any method which provides a product in which the silica is reasonably uniformly coated with the wax. A preferred method comprises passing the silica and the wax concurrently through a size reduction apparatus such as a microniser or a jet mill. In a preferred method, the wax and the silica are thoroughly blended in appropriate proportions by mixing in a conventional blender before feeding to the microniser or mill. Alternatively, the wax and silica can be separately fed at appropriate rates to the microniser or mill. The operating conditions of the mill are fixed so as to ensure that the mixture of silica and wax reaches a temperature above the melting point of the wax as it passes through the microniser or mill. The silica is also reduced in size during the micronising or milling process so that the treated silica has a particle size appropriate to its use as a matting agent, usually within the limits mentioned hereinbefore.

The siccative compound for use in the compositions of the invention is a transition metal chelate complex comprising a ligand. Such compounds have been found to be particularly effective as alternative siccative compounds to the soap-based cobalt siccative compounds generally used in the paint and resin industries.

The ligand may be selected from a bidentate, tridentate, tetradentate, pentadentate or hexadentate ligand, or a mixture thereof. In particular, the ligand may be a nitrogen donor ligand. Specific suitable ligands include ligands selected from a bispidon ligand, an N4Py ligand, a TACN ligand, a trispicen ligand, a cyclen ligand or a cross-bridged ligand.

Preferably, the siccative compound is an iron- or manganese-based siccative compound. The iron ion may be selected from Fe(II) and Fe(III) and the manganese ion may be selected from Mn(II), Mn(III), and Mn (IV).

The ligand may be present in one or more of the forms [MnLCl$_2$]; [FeLCl$_2$]; [FeLCl]Cl; [FeL (H$_2$O)] (PF$_6$)$_2$; [FeL] Cl$_2$, [FeLCl]PF$_6$ and [FeL (H$_2$O)] (BF$_4$)$_2$, where L represents the ligand.

Specific examples of suitable siccative compounds are as set out in WO 2008/003652 and include:

Dimethyl 2, 4-di-(2-pyridyl)-3-methyl-7-(pyridin-2-ylmethyl)-3,7-diaza-bicyclo[3.3.1]nonan-9-one-1,5-dicarboxylate (N2py3o-Cl) and the iron (II) complex thereof [Fe(N2py3o-Cl)Cl]Cl prepared as described in WO-A-02/48301.

Dimethyl 2,4-di-(2-pyridyl)-3-octyl-7-(pyridin-2-ylmethyl)-3,7-diaza-bicyclo[3.3.1]nonan-9-one-1,5-dicarboxylate (N2py3o-C8) and Dimethyl 2, 4-di-(2-pyridyl)-3-octadecyl-7-(pyridin-2-ylmethyl)-3,7-diaza-bicyclo[3.3.1]nonan-9-one-1, 5-dicarboxylate (N2py3o-C18) and the corresponding iron complexes, [Fe (N2py3o-C8) Cl] Cl and [Fe (N2py3o-C18) Cl] Cl, prepared as described in WO 2005/042532.

N,N-bis (pyridin-2-yl-methyl)-bis (pyridin-2-yl) methylamine, referred to as N4Py, and the corresponding iron (II) complex, [Fe (N4py) Cl] Cl, prepared as described in EP0765381.

N,N-bis (pyridin-2-yl-methyl-1,1-bis (pyridin-2-yl)-1-aminoethane, referred to as MeN4Py, and the corresponding iron (II) complex, [Fe (MeN4py) Cl] Cl, prepared as described in EP0909809.

4,11-dimethyl-1,4,8,11-tetraazabicyclo [6.6.2] hexadecane, referred to as Bcyclam, and the corresponding manganese (II) complex, [Mn (Bcyclam) Cl$_2$], prepared as described in WO98/39098 and J. Am. Chem. Soc, 122, 2512 (2000).

N-methyl-trispicen (Metrispicen), N-octyl-trispicen (C8-trispicen), N-octadecyl-trispicen (C18-trispicen) synthesized according to literature procedures (Bernal, J.; et al. J. Chem. Soc, Dalton Trans. 1995, 3667) and GB2386615. The corresponding iron (II) complexes, [Fe (Metrispicen) Cl] Cl, [Fe (C8-trispicen) Cl] Cl, and [Fe(C18-trispicen) Cl] Cl, may be prepared similarly to the procedure described in EP-A-0909809 for the MeN4py analog.

1,4-bis (quinolin-2-ylmethyl)-7-ethyl-1,4,7-triazacyclononane (Quin$_2$TACN) and the corresponding [Fe (Quin$_2$TACN) Cl] ClO$_4$ compound prepared as disclosed in EP-A-1259522. Mn$_2$ ([mu]-O)$_3$(1,4,7-trimethyl-1,4,7-triazacyclononane)$_2$] PF$_6$)$_2$ may prepared as published in J. Chem. Soc, Dalton Trans, 353 (1996).

A suitable commercially available siccative compound suitable for use in the invention is Borchi® Oxy-coat 1101 which is supplied as an iron chelate complex comprising a ligand. The siccative compound is supplied as a 1% solution in water with an overall Fe content of 0.09% expressed as weight percent of metal present the solution.

An alternative commercially available siccative compound suitable for use in the invention is Nuodex DryCoat (Rockwood) which is supplied as a manganese chelate complex comprising a ligand. The siccative compound is supplied as an 8% solution in kerosene with an overall Mn content of 1% expressed as weight percent of metal present the solution.

Other commercially available siccative compounds suitable for use in the invention are WorleeAdd 2500 (Worlee), Borchers Dry 0133, Borchers Dry 0246 and Borchers Dry 0410 (OMG Borchers), which are all supplied as manganese chelate complexes comprising ligands; Mordry 410/20 (Delta); Nouryact (Akzo Nobel) and Drycat 408 (Dura Chemicals)

The curable liquid composition of the invention may be, for instance, a water-based paint such as an emulsion paint or a dispersion paint, where water or an aqueous solution forms the continuous phase, a solvent-based paint (with a non-aqueous solvent as the continuous phase), a varnish, a wood stain, or an ink.

Typically, other ingredients will also be present in the curable liquid compositions of the invention. Suitable organic solvents for use with the compositions of the invention include aliphatic, cycloaliphatic and aromatic hydrocarbons, alcohol ethers, alcohol esters and N-methylpyrrolidone. However the compositions of the invention may also be in the form of an emulsion, with an aqueous solvent (by aqueous solvent is meant a solvent containing at least 65% by weight of water) carrying the alkyd resin (which may be dissolved in an organic solvent) in the form of an emulsion. Typically, solvent may be present as 10% or more by weight of the compositions of the invention. Suitable emulsifiers may be used to provide a stable emulsion and are well known in the art.

The composition of the invention may contain one or more further ingredients selected from colourants, pigments, anti-corrosive pigments, extenders, dyes, plasticizers, surface-controlling agents, so-called through-drying agents, anti-skinning agents, defoaming agents, rheological controlling agents, ultraviolet absorbers or the like. Through-drying agents are compounds aimed at modifying the drying behaviour, such as calcium- or zirconium-based catalytic compounds. The further ingredients set out in this paragraph will typically be present at levels up to 5% by weight of the compositions of the invention, save for pigments or extenders which may be present at higher levels, such as up to 20% by weight, or even higher. Pigments serve to provide colour and opacity but may also absorb UV as well as contributing to the structural strength of the cured composition. Extenders are mineral components which may also be included in order to replace part of any TiO$_2$ present as opacifier, for cost saving purposes, to improve application characteristics, to act as flatting agents to further reduce gloss, to inhibit settling of pigments or to provide improved keying for subsequent coats of paint. Common extenders include minerals such as calcium carbonate, talc, barites, kaolin, mica and the like.

The composition of the invention may consist, or consist essentially of solvent, binder, siccative compound, matting agent as set out hereinbefore, for instance for varnish-type compositions.

The blending of the compositions of the invention may be carried out using conventional blending techniques, known to the person skilled in the art. The matting agent may be added during the production of the composition of the invention at any suitable juncture.

The second aspect of the invention provides the use of a precipitated silica having a surface area of 250 m$^2$/g or less, preferably 200 m$^2$/g or less, more preferably 150 m$^2$/g or less, even more preferably 100 m$^2$/g and most preferably 70 m$^2$/g or less, as measured by BET, a precipitated metal silicate, or a mixture thereof, as a matting agent for a curable liquid composition comprising a binder curable by oxidative crosslinking and a transition metal chelate complex, comprising a ligand, as a siccative compound adapted to catalyse oxidative crosslinking of the binder. When the matting agent in the composition of the second aspect of the invention is, or includes, a precipitated metal silicate, the silicate preferably has a surface area of 450 m$^2$/g or less, more preferably 400 m$^2$/g or less and even more 250 m$^2$/g or less as measured by BET. In particularly preferred embodiments, the precipitated metal silicate has a surface area of 200 m$^2$/g or less, preferably 100 m$^2$/g or less and most preferably 70 m$^2$/g or less, as measured by BET.

This use, of the second aspect of the invention, is for producing a cured composition having a surface with a matt finish, without the time required for curing of the curable liquid composition being excessively longer than the time required for curing of an otherwise identical curable liquid composition without the matting agent present.

The preferred features set out for the first aspect of the invention, in relation to the binder, the siccative compounds and the precipitated metal silicate, are equally applicable to the use of the second aspect of the invention. For instance, the matting agent is preferably amorphous. When the matting agent for the second aspect of the invention is a precipitated metal silicate, it is preferably selected from aluminium silicate, calcium silicate or mixtures thereof, more preferably aluminium silicate.

The second aspect of the invention is particularly applicable when the binder is, or comprises an alkyd resin and the curable liquid composition is a water-based paint such as an emulsion paint or a dispersion paint, a solvent-based paint, a varnish, a wood stain, or an ink.

The use of the second aspect of the invention is particularly beneficial in providing rapid curing in combination with good matting, when the matting agent has a surface area of 70 m$^2$/g or less, and wherein the curable liquid composition is free from, or comprises 0.1% by weight or less, of amorphous silica having a surface area greater than 70 m$^2$/g, as measured by BET. This particular arrangement of the second aspect of the invention is especially suitable for producing a cured composition having a surface with a matt finish, without the time required for curing of the curable liquid composition being excessively longer than the time required for curing of an otherwise identical curable liquid composition without the matting agent present. This use according to the invention is particularly beneficial when the matting agent is an amorphous precipitated metal silicate as set out hereinbefore.

The use of the second aspect of the invention is also particularly effective for preventing excessive increase in curing times when the siccative compound is an iron or a manganese chelate complex comprising a nitrogen donor ligand which is a bidentate, tridentate, tetradentate, pentadentate or hexadentate ligand, or a mixture thereof.

The invention will now be illustrated with reference to the following non-limiting examples.

EXAMPLES

A.P. indicates "Amorphous Precipitated" throughout the tables set out below.

Table 1 shows the surface area and pore volume as measured by BET, and the Linseed Oil Absorption values measured as set out hereinbefore for a series of matting agents according to the invention and also for comparative matting agents. In Table 1, the metal silicates which are in accordance with the invention are identified as 1i-7i (the "i" designation referring to "invention" for ease of reference), the silica which is in accordance with the invention is identified as 8i. Silicas 9c-12c are comparative examples (the "c" designation referring to "comparison").

TABLE 1

Matting Agents

| Agent No. | Matting Agent | Particle Size (μm) | Wax Level (% w/w) | Surface Area (m$^2$/g) | Pore Volume (cm$^3$/g) | Linseed Oil Abs. (g/100 g) | Molar ratio (M$_x$O:SiO$_2$) |
|---|---|---|---|---|---|---|---|
| 1i | A.P. Al Silicate P | 11.0 | | 62 | 0.33 | 150 | 0.07 |
| 2i | A.P. Al Silicate R | 6.0 | | 67 | 0.41 | 140 | 0.07 |
| 3i | A.P. Al Silicate P W1 | 6.0 | 10 | 43 | 0.27 | 130 | 0.07 |
| 4i | A.P. Al Silicate P W2 | 6.0 | 15 | 41 | 0.3 | 115 | 0.07 |
| 5i | A.P. Ca Silicate Q | 5.0 | | 26 | 0.14 | 140 | 0.35 |
| 6i | A.P. Mg Silicate S | 20 | | 62 | 0.1 | 60 | 0.24 |
| 7i | A.P. Mg Silicate T | 12 | | 380 | 0.3 | 66 | 0.64 |
| 8i | A.P. Silica A | 10 | | 43 | 0.25 | 120 | — |
| 9c | A.P. Silica C | 6.0 | | 590 | 1.71 | 320 | — |
| 10c | A.P. Silica D | 6.0 | | 290 | 1.2 | 220 | — |
| 11c | Silica Gel X* | 6.0 | | 289 | 1.56 | 260 | — |
| 12c | Silica Gel Y† | 6.5 | 12 | 400 | 1.6 | 250 | — |

*Available from PQ Corporation under the trade name "Gasil 23F" ®;
†Available from PQ Corporation under the trade name "Gasil HP340M" ®.

Matting agents A.P. Al Silicate R, A.P. Al Silicate P W1, A.P. Al Silicate P W2, A.P. Ca Silicate Q, A.P. Silica C, A.P. Silica D, Silica Gel X, Silica Gel Y (2i, 3i, 4i, 5i, 9c, 10c, 11c and 12c respectively) of Table 1 were milled to their respective particle sizes suitable for use as matting agents, using a fluid energy mill/classifier. The other matting agents were used in their 'as produced' form and their particle sizes are also indicated in Table 1 above.

Matting agents A.P. Al Silicate P W1, A.P. Al Silicate P W2 and Silica Gel Y (3i, 4i, and 12c respectively) were wax-coated. A.P. Al Silicate P W1 had a wax content of 10% hard polyethylene wax (based on the weight of the silicate), A.P. Al Silicate P W2 had a wax content of 15% microcrystalline wax and Silica Gel Y had a wax content of 12% microcrystalline wax.

Example 1

In a first series of experiments, the matting agents listed below (taken from Table 1 above) were used to prepare matt-finish varnishes in the air-curing varnish composition reported in Table 2

| | |
|---|---|
| 1i | A.P. Al Silicate P; |
| 5i | A.P. Ca Silicate Q; |
| 8i | A.P. Silica A; |
| 9c | A.P. Silica C; |
| 10c | A.P. Silica D; and |
| 11c | Silica Gel X. |

The varnishes were applied using a K-bar, wired hand coater, or a block applicator at 100 μm wet film thickness.

All of the dried varnishes provided an adequate matt finish, except for the composition with no added matting agent, which provided a gloss finish.

For each composition where matting agent was included, the level of incorporation was 5% by weight of the compositions.

TABLE 2

Varnish Composition

| Trade Name | Ingredient type | Weight added |
| --- | --- | --- |
| Synolac 4060 WDA 90 | alkyd resin | 71.48 |
| Shellsol D60 | solvent | 24.88 |
| [1]Borchi ® Oxy-coat 1101 | siccative | 0.68 |
| (1% solution of active) | | |
| [1]Octasoligen ™ Zr12 | through dryer | 1.18 |
| [1]Octasoligen ™ Ca10 | through dryer | 1.42 |
| [1]Borchinox ™ M2 | antiskinning agent | 0.35 |
| TOTAL | | 100 |

[1](the weight added refers to the commercial ingredient including solvent/carrier)

The level of Borchi® Oxy-coat 1101 corresponds to 3.7 ppm (parts per million) chelated iron in the composition.

Tables 3 and 4 show the times required to reach various drying stages for the compositions. The times were measured manually by hand touch, using the drying stages as set out below:—

Tacky=tacky to touch. Touching leaves a significant mark, in most cases the surface is left permanently damaged/broken. Significant drag is experienced on removing the finger.

Sl. Tacky=slightly tacky to touch. Touching leaves little mark and not permanent damage. A little drag is experienced on removing the finger.

V. Sl. Tacky=very slightly tacky to touch. No mark is noticed on touching but surface is not dry to touch.

Dry=no tackiness.

In Table 3, the drying times were measured at room temperature (25° C.) whereas in Table 4 cold drying conditions were used (9° C.) and so drying times were longer. For the gloss varnish, without matting agent, the time to full dryness was 8 hours (RT) and 16 hours (cold) respectively.

The incorporation of comparative matting agents A.P. Silica C, A.P. Silica D and Silica Gel X (9c, 10c and 11c respectively) into the varnish base (which all had surface areas in excess of 250 m²/g) led to an increase in drying time to 55 hours at RT and in excess of 60 hours when cold. No further measurements were made in these experiments when drying had not been achieved by 60 hours.

TABLE 3

Varnish RT drying

| Agent No. | Time to dry to specific degree\ Matting Agent | Sl. Tacky (hrs) | V. Sl. Tacky (hrs) | Dry (hrs) | Gloss (% when dry) |
| --- | --- | --- | --- | --- | --- |
| N/A | None | 4 | 5 | 8 | 90 |
| 1i | A.P. Al Silicate P | 11 | 24 | 37 | 57 |
| 5i | A.P. Ca Silicate Q | 24 | 30 | 38 | 40 |
| 8i | A.P. Silica A | 30 | 36 | 45 | 67 |
| 9c | A.P. Silica C | 43 | 48 | 55 | 78 |
| 10c | A.P. Silica D | 37 | 48 | 55 | 80 |
| 11c | Silica Gel X | 37 | 50 | 55 | 57 |

TABLE 4

Varnish cold drying

| Agent No. | Time to dry to specific degree\ Matting Agent | Sl. Tacky (hrs) | V. Sl. Tacky (hrs) | Dry (hrs) | Gloss (% when dry) |
| --- | --- | --- | --- | --- | --- |
| N/A | None | 6 | 11 | 16 | 89 |
| 1i | A.P. Al Silicate P | 13 | 30 | 38 | 60 |
| 5i | A.P. Ca Silicate Q | 26 | 50 | >60 | 35 |
| 8i | A.P. Silica A | 37 | 55 | >60 | 74 |
| 9c | A.P. Silica C | >60 | >60 | >60 | 48 |
| 10c | A.P. Silica D | >60 | >60 | >60 | 82 |
| 11c | Silica Gel X | >60 | >60 | >60 | 76 |

For the A.P. Al Silicate P, A.P. Ca Silicate Q, and A.P. Silica A matting agents (1i, 5i and 8i respectively), although the drying times for RT drying are considerably longer than for the gloss varnish, these matting agents give considerable improvement in shortening drying time for RT drying relative to the silicas A.P. Silica C, A.P. Silica D and Silica Gel X (9c, 10c and 11c respectively) in this system.

For cold drying (9° C.), only the A.P. Al Silicate P sample (1i) gives drying within 60 hours, with samples A.P. Ca Silicate Q and A.P. Silica A (5i and 8i respectively) only achieving V. Sl. Tackiness within the 60 hour period.

Overall, the experimental results for the varnish demonstrate the usefulness of the matting agents as set out in the claims to replace conventional high surface area silicas as matting agents in compositions where an alternative to cobalt soap-based siccative agents is used.

Neither the matting agents according to the invention, A.P. Al Silicate P, A.P. Ca Silicate Q and A.P. Silica A (1i, 5i and 8i respectively), nor the comparative high surface area silica amorphous precipitated matting agents such as A.P. Silica C, A.P. Silica D and Silica Gel X (9c, 10c and 11c respectively), were found to cause any significant lengthening of drying times, when added at 5% level to provide a matting effect in a varnish composition using a cobalt soap-based siccative agent. This was confirmed by preparing a varnish composition substantially the same as the varnish of Table 2, but with the Borchi® Oxy-coat siccative compound replaced by Octasoligen™ Cobalt (supplied by OMG Borchers). In this case, the drying time for the composition with or without matting agent was the same and was in the range from 5 to 8 hours at room temperature and from 10 to 20 hours when cold.

Example 2

Air-curing paint compositions were prepared by incorporating matting agents into the base composition identified in Table 5 below. The matting agents were included in the base composition at the level of incorporation, given as % w/w, identified in Tables 6 and 7 below. The matting agents used to prepare each of the air-curing paint compositions were as follows:

| 1i | A.P. Al Silicate P; |
| --- | --- |
| 2i | A.P. Al Silicate R; |
| 5i | A.P. Ca Silicate Q; |
| 6i | A.P. Mg Silicate S; |
| 7i | A.P. Mg Silicate T; |
| 8i | A.P. Silica A; |
| 9c | A.P. Silica C; |
| 11c | Silica Gel X; and |
| 12c | Silica Gel Y. |

The paints were applied using a K-bar, wired hand coater, or a block applicator at 100 μm wet film thickness.

TABLE 5

| Base Composition | | |
|---|---|---|
| Trade Name/Ingredient | Ingredient type | Weight added |
| Synolac 4047 WD90 | alkyd resin | 512.6 |
| Anti Terra 206 | dispersant | 2.4 |
| Tioxide TR92 | pigment | 342.4 |
| Shellsol D40 | solvent | 110.8 |
| [1]Borchi ® Oxy-coat 1101 (1% solution of active) | siccative | 9.1 |
| [1]Octasoligen ™ Ca10 | through dryer | 18.2 |
| [1]Borchinox ™ M2 | anti-skinning agent | 4.5 |
| Base composition SUBTOTAL | | 1000 |

[1](the weight added refers to the commercial ingredient including solvent/carrier)

The time taken for each of the paint compositions to reach various stages of dryness was measured using the B.K. drier test method (ASTM D5895-13) and a Braive recorder (Sheen Instruments Ltd). These measurements involved dragging a blunt needle through the drying paint at a speed of 24.4 mm/h to create a track/impression in the paint. As the paint dried, different impressions were observed, which were classified generally into the drying stages set out below:

| | |
|---|---|
| Set-to-touch = | paint does not flow back into the track left by the needle, a pear-shaped depression appears in the paint; |
| Tack-free = | paint surface begins to dry, the needle rips the surface of the paint; |
| Dry hard = | paint is starting to through dry, the needle leaves an impression on the surface of the paint; and |
| Dry through = | no impression is formed. |

Table 6 below shows the times required to reach the start of the drying stages for each of the series of paints mentioned above. Each paint composition is identified in each instance by the matting agent used to produce that paint composition. The additional paint prepared without a matting agent is identified as "No silica". In Table 6, the drying times were measured at RT (25° C.). The experiments were terminated at 24 hours.

In some instances, a visible track was not evident for each drying stage. This is indicated in Table 6 below. In some instances a stage was not reached within the 24 hour period in which the test was run. This is also indicated in Table 6 below.

No significant drying was observed for most samples in cold conditions within 24 hrs. In order to obtain further data for the cold drying conditions, a further experiment was conducted in cold drying conditions using the touch-drying method set out in Example 1. This experiment was terminated at 48 hours. Table 7 below shows the time required to reach various touch drying stages for the compositions as measured at 9° C. using the touch dry method.

The gloss value for each paint composition after 14 days of drying was measured at 60 degrees on dried paints or varnishes coated on Leneta™ cards using a BYK Multigloss meter and is included in Tables 6 and 7 below.

TABLE 6

Paint RT Drying (B.K. Drier Test Method)

| Agent No. | Matting Agent | % w/w of Matting Agent | Set-to-touch (hrs) | Tack-free (hrs) | Dry-hard (hrs) | Dry-through (hrs) | Gloss (% at 14 days) |
|---|---|---|---|---|---|---|---|
| N/A | No Silica | | 0.75 | 1 | → | 7 | 88 |
| 1i | A.P. Al Silicate P | 7.5 | 1 | 11 | ≥24 | ** | 68 |
| 2i | A.P. Al Silicate R | 10 | 4 | 8 | ≥24 | ** | 80 |
| 5i | A.P. Ca Silicate Q | 7.5 | 7 | 11 | ≥24 | ** | 82 |
| 6i | A.P. Mg Silicate S | 10 | 2 | 3.5 | 5 | 13 | 53 |
| 7i | A.P. Mg Silicate T | 7.5 | 1 | 14 | 20 | ≥24 | 71 |
| 8i | A.P. Silica A | 10 | → | 14 | ≥24 | ** | 60 |
| 9c | A.P Silica C | 7.5 | ≥24 | ** | ** | ** | 56 |
| 11c | Silica Gel X | 7.5 | ≥24 | ** | ** | ** | 85 |
| 12c | Silica Gel Y | 7.5 | ≥24 | ** | ** | ** | 80 |

→ Stage not visible
** Stage not reached in 24 hrs

TABLE 7

Paint Cold Drying (Touch Test Method)

| Agent No. | Time to dry to specific degree\ Matting Agent | % w/w of Matting Agent | Sl. Tacky (hrs) | V. Sl. Tacky (hrs) | Dry (hrs) | Gloss (% at 14 days) |
|---|---|---|---|---|---|---|
| N/A | No Silica | | 4 | 4.5 | 5.5 | 80 |
| 1i | A.P. Al Silicate P | 7.5 | 18 | 22 | 23 | 64 |
| 2i | A.P. Al Silicate R | 10 | 12 | 23 | 24 | 69 |
| 5i | A.P. Ca Silicate Q | 7.5 | 29 | 34 | 38 | 68 |
| 6i | A.P. Mg Silicate S | 10 | 4 | 6 | 7 | 65 |
| 7i | A.P. Mg Silicate T | 7.5 | 23 | 25 | 26 | 74 |
| 8i | A.P. Silica A | 10 | 36 | ≥48 | | 69 |
| 9c | A.P. Silica C | 7.5 | ≥48 | | | 63 |
| 11c | Silica Gel X | 7.5 | ≥48 | | | 20 |
| 12c | Silica Gel Y | 7.5 | ≥48 | | | 40 |

In the B.K. drier test method with RT (25° C.) drying, the paint formulated with the A.P. Mg Silicate S matting agent (6i) had the quickest drying time.

In this B.K. test method with RT (25° C.) drying, it was further found that paints formulated with the matting agents A.P. Al Silicate P, A.P. Al Silicate R, A.P. Ca Silicate Q and A.P. Mg Silicate T (1i, 2i, 5i and 7i respectively) had considerably improved drying time relative to the paints formulated with matting agents, A.P. Silica C, Silica Gel X and Silica Gel Y (9c, 11c and 12c respectively). Matting Agent A.P. Silica A (8i) showed some improvement over A.P. Silica C, Silica Gel X and Silica Gel Y (9c, 11c and 12c respectively).

The touch test method for cold drying (9° C.) confirmed the RT results showing that the paint formulated with matting agent A.P. Mg Silicate S (6i) had the quickest drying time, demonstrating only a marginally slower drying time than the gloss (i.e. No Silica) paint.

In the touch test method for cold drying, it was further found that paints formulated with matting agents A.P. Al Silicate P, A.P. Al Silicate R, A.P. Ca Silicate Q and A.P. Mg Silicate T (1i, 2i, 5i, and 7i respectively) had considerably improved drying time relative to the paints formulated with matting agents A.P. Silica C, Silica Gel X and Silica Gel Y (9c, 11c and 12c respectively).

Overall, the experimental results for the paint formulated with siccative agent Oxy-coat demonstrate the usefulness of the matting agents as set out in the claims to replace conventional high surface area silicas as matting agents in compositions where an alternative to cobalt soap-based siccative agents is used.

All of the dried paints provided an adequate matt finish, except for the composition with no added matting agent, which provided a gloss finish.

Example 3

Air-curing paint compositions were prepared by incorporating matting agents into a base composition generally as identified in Table 5 above but with a different siccative agent. In this experiment, the Borchi Oxy-coat 1101 siccative agent was used in the base composition of Table 5 (Example 2) was substituted for Nuodex DryCoat (Rockwood) siccative agent (8% Kerosene solution of manganese chelate complex as described above). Matting agents were included at the level of incorporation, given as % w/w, identified in Table 8 below. The matting agents used to prepare the air-curing paints were as follows:

| | |
|---|---|
| 1i | A.P. Al Silicate P; |
| 2i | A.P. Al Silicate R; |
| 3i | A.P. Al Silicate P W1; |
| 4i | A.P. Al Silicate P W2; |
| 5i | A.P. Ca Silicate Q; |
| 6i | A.P. Mg Silicate S; |
| 7i | A.P. Mg Silicate T; |
| 9c | A.P. Silica C; |
| 11c | Silica Gel X; and |
| 12c | Silica Gel Y |

An additional paint was prepared without a matting agent, for comparison. The time taken for each of the paint compositions to reach the start of various stages of dryness was measured using the B.K. drier test method in accordance with Example 2. The drying times were measured under cold drying conditions (9° C.). Table 8 shows the times required to reach various drying stages for the compositions. Each paint composition is identified in each instance by the matting agent used to produce that paint composition. The additional paint prepared without a matting agent is identified as "No Silica". The gloss value for each paint composition, as measured using the method described in Example 2, is also included in Table 8 below.

TABLE 8

Paint Cold Drying (B.K. Drier Test Method)

| Agent No. | Matting Agent | % w/w of Matting Agent | Set-to-touch (hrs) | Tack-free (hrs) | Dry-hard (hrs) | Dry-through (hrs) | Gloss (% at 14 days) |
|---|---|---|---|---|---|---|---|
| N/A | No Silica | 7.5 | 1 | 6 | → | 10 | 89 |
| 1i | A.P. Al Silicate P | 7.5 | 1 | 10 | 12 | 19 | 57 |
| 2i | A.P. Al Silicate R | 7.5 | → | 12.5 | 13.5 | 18 | 71 |
| 3i | A.P. Al Silicate P W1 | 7.5 | 1 | 12.5 | 14 | 20 | 72 |
| 4i | A.P. Al Silicate P W2 | 7.5 | 1 | 12 | 13.5 | 18 | 76 |
| 5i | A.P. Ca Silicate Q | 7.5 | 1 | → | 14 | 16 | 50 |
| 6i | A.P. Mg Silicate S | 7.5 | 1 | 8 | → | 11 | 75 |
| 7i | A.P. Mg Silicate T | 7.5 | 1 | 18 | 20 | ≥24 | 75 |
| 9c | A.P. Silica C | 7.5 | 1 | ≥24 | ** | ** | 50 |
| 11c | Silica Gel X | 7.5 | 1 | ≥24 | ** | ** | 70 |
| 12c | Silica Gel Y | 7.5 | 1 | ≥24 | ** | ** | 61 |

→ Stage not evident
** Stage not reached in 24 hrs

For cold drying (9° C.) using the B.K. test method, paints formulated with matting agents A.P. Al Silicate P, A.P. Al Silicate R, A.P. Al Silicate P W1, A.P. Al Silicate P W2, A.P. Ca Silicate Q, A.P. Mg Silicate S and A.P. Mg Silicate T (1i, 2i, 3i, 4i, 5i, 6i and 7i respectively) had considerably improved drying time relative to paints formulated with matting agents A.P. Silica C, Silica Gel X and Silica Gel Y (9c, 11c and 12c respectively).

Overall, the experimental results for the paint formulated with siccative agent DryCoat demonstrate the usefulness of the matting agents as set out in the claims to replace conventional high surface area silicas as matting agents in compositions where an alternative to cobalt soap-based siccative agents is used.

All of the dried paints provided an adequate matt finish, except for the composition with no added matting agent, which provided a gloss finish.

It will be appreciated that numerous modifications to the above described embodiments may be made without departing from the scope of the invention as defined in the appended claims.

The described and illustrated embodiments are to be considered as illustrative and not restrictive in character, it being understood that only the specific embodiments according to the invention have been shown and described and that all changes and modifications that come within the scope of the invention, as set out in the accompanying claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

We claim:

1. A curable liquid composition comprising:
   a) a binder curable by oxidative crosslinking,
   b) a siccative compound adapted to catalyse oxidative crosslinking of the binder, and
   c) a matting agent,
wherein the siccative compound is a transition metal chelate complex comprising a ligand, and the matting agent is:
   a precipitated silica having a surface area of 70 m$^2$/g or less as measured by the Brunauer-Emmett-Teller theory (BET),
   a precipitated metal silicate, or
   a mixture thereof.

2. The curable liquid composition according to claim 1, wherein the matting agent is an amorphous precipitated silica or an amorphous precipitated metal silicate.

3. The curable liquid composition according to claim 2, wherein the matting agent is the amorphous precipitated metal silicate and the curable liquid composition is free from, or further comprises 0.1% by weight or less, of an amorphous silica having a surface area greater than 250 m$^2$/g, as measured by BET.

4. The curable liquid composition according to claim 3, wherein the amorphous precipitated metal silicate has a surface area of 70 m$^2$/g or less, and wherein the curable liquid composition is free from, or further comprises 0.1% by weight or less, of an amorphous silica having a surface area greater than 70 m$^2$/g, as measured by BET.

5. The curable liquid composition according to claim 1, wherein the matting agent is the precipitated metal silicate and has a surface area of 450 m$^2$/g or less as measured by BET.

6. The curable liquid composition according to claim 5, wherein the precipitated metal silicate has a surface area of 250 m$^2$/g or less as measured by BET.

7. The curable liquid composition according to claim 1, wherein the precipitated metal silicate has a surface area of 150 m$^2$/g or less, as measured by BET.

8. The curable liquid composition according to claim 7, wherein the precipitated metal silicate has a surface area of 100 m$^2$/g or less as measured by BET.

9. The curable liquid composition according to claim 8, wherein the precipitated metal silicate has a surface area of 70 m$^2$/g or less as measured by BET.

10. The curable liquid composition according to claim 1, wherein the matting agent is the precipitated metal silicate, wherein the metal M is one or more metals from groups 2 to 13 of the periodic table and wherein the molar ratio $M_xO/SiO_2$ is 0.05 or more, where $M_xO$ represents the stoichiometric formula of the metal oxide(s) in the precipitated metal silicate with x equal to 2/v where v is the valency of the metal.

11. The curable liquid composition according to claim 10, wherein the metal of the precipitated metal silicate is selected from the group consisting of aluminum, calcium, magnesium and mixtures thereof.

12. The curable liquid composition according to claim 10, wherein the molar ratio $M_xO/SiO_2$ is from 0.05 to 0.6, where $M_xO$ represents the stoichiometric formula of the metal oxide(s) in the precipitated metal silicate with x equal to 2/v where v is the valency of the metal.

13. The curable liquid composition according to claim 1, wherein the transition metal of the siccative compound comprises less than 1% by weight of cobalt.

14. The curable liquid composition according to claim 1, wherein the transition metal of the siccative compound consists essentially of iron, manganese or a mixture thereof.

15. The curable liquid composition according to claim 1, wherein the ligand is selected from the group consisting of bidentate, tridentate, tetradentate, pentadentate or hexadentate ligand, and a mixture thereof.

16. The curable liquid composition according to claim 1, wherein the ligand is a nitrogen donor ligand.

17. The curable liquid composition according to claim 16, wherein the ligand is selected from a bispidon ligand, an N4Py ligand, a TACN ligand, a trispicen ligand, a cyclam ligand or a cross-bridged ligand.

18. The curable liquid composition according to claim 1, wherein the binder comprises a conjugated polyunsaturated fatty acid moiety.

19. The curable liquid composition according to claim 1, wherein the binder is, or comprises, an alkyd resin.

20. The curable liquid composition according to claim 19, wherein the curable liquid composition is an emulsion paint, a solvent-based paint, a varnish, a wood stain, or an ink.

21. The composition as claimed in claim 1, wherein,
   (i) the composition is a paint or varnish
   (ii) the binder comprises an alkyd resin; and
   (iii) the alkyd resin is oxidatively cross-linked when the composition is applied as a layer to a surface by diffusion of oxygen from ambient air into the layer.

22. A method of coating a surface comprising applying to the surface a curable liquid composition comprising:
   a binder curable by oxidative crosslinking, and
   a transition metal chelate complex comprising a ligand as a siccative compound adapted to catalyse oxidative crosslinking of the binder, and curing the liquid composition wherein the curable composition incorporates a matting agent which comprises a precipitated silica having a surface area of 250 m$^2$/g or less, as measured by BET, a precipitated metal silicate, or a mixture thereof.

23. The method of claim 22 wherein the binder is, or comprises an alkyd resin and wherein the curable liquid composition is a water-based paint, a solvent-based paint, a varnish, a wood stain, or an ink.

24. The method of claim 22 wherein the matting agent has a surface area of 70 m$^2$/g or less, and wherein the curable liquid composition is free from, or further comprises 0.1% by weight or less, of an amorphous silica having a surface area greater than 70 m$^2$/g, as measured by BET.

25. The method of claim 22, wherein the matting agent is selected from the group consisting of amorphous precipitated aluminium silicate, amorphous precipitated calcium silicate, amorphous precipitated magnesium silicate and mixtures thereof.

* * * * *